United States Patent [19]

Zimmerman

[11] Patent Number: 4,687,903

[45] Date of Patent: Aug. 18, 1987

[54] THERMOSTATICALLY CONTROLLED ELECTRICALLY HEATED SOLDERING BIT

[76] Inventor: Danny Zimmerman, 458 Salaberry North Boulevard, Chateauguay Quebec, Canada, J6J 4M3

[21] Appl. No.: 780,889

[22] Filed: Sep. 27, 1985

[30] Foreign Application Priority Data

Nov. 1, 1984 [CA] Canada ................................ 466804

[51] Int. Cl.⁴ ......................... H05B 1/02; B23K 3/04; H01C 8/00; H01B 1/06
[52] U.S. Cl. .................................. 219/241; 219/229; 219/237; 219/253; 219/517; 219/544; 219/553; 228/51; 228/54; 252/504; 252/516; 338/25; 338/223; 338/240; 374/174
[58] Field of Search ................ 219/227, 228, 229–233, 219/236–241, 544, 552, 553, 530, 523, 254, 255, 517, 253; 338/223, 224, 225, 240, 25; 252/516, 504; 228/51–55; 374/174

[56] References Cited

U.S. PATENT DOCUMENTS

| | | | |
|---|---|---|---|
| 287,758 | 10/1883 | Dyer et al. | 338/225 X |
| 421,185 | 2/1890 | Miner | 219/553 X |
| 467,075 | 1/1892 | Appleyard . | |
| 594,872 | 12/1897 | Harriman . | |
| 606,769 | 7/1898 | Sill | 338/224 |
| 670,667 | 3/1901 | Hadaway | 338/224 X |
| 796,684 | 8/1905 | Thomson . | |
| 864,723 | 8/1907 | Bolling | 252/516 |
| 870,779 | 11/1907 | Hartwig | 219/233 |
| 877,843 | 1/1908 | Hoskin | 219/544 X |
| 1,105,047 | 7/1914 | Thomson | 219/553 X |
| 1,451,880 | 4/1923 | Lightfoot | 338/240 X |
| 1,456,760 | 5/1923 | Borton | 219/233 |
| 1,515,202 | 11/1924 | Hineline | 219/517 X |
| 1,592,376 | 7/1926 | MacFarland | 338/224 |
| 1,663,810 | 3/1928 | Morse | 219/553 X |
| 2,001,297 | 5/1935 | Boyles | 252/516 X |
| 2,329,085 | 9/1943 | Ridgway | 338/223 X |
| 2,582,481 | 1/1952 | Dvorak et al. | 219/229 X |
| 2,668,897 | 2/1954 | Beach et al. | 219/254 |
| 2,699,485 | 1/1955 | Wolf | 219/229 |
| 2,861,163 | 11/1958 | Asakawa . | |
| 3,201,736 | 8/1965 | Ovshinsky | 338/25 |

FOREIGN PATENT DOCUMENTS

| | | | |
|---|---|---|---|
| 163849 | 8/1949 | Austria | 219/233 |
| 365618 | 4/1937 | Canada . | |
| 376879 | 10/1938 | Canada . | |
| 210887 | 6/1909 | Fed. Rep. of Germany | 338/223 |
| 508726 | 8/1920 | France | 338/223 |
| 774544 | 9/1934 | France | 219/523 |
| 34725 | 7/1905 | Switzerland | 219/553 |
| 247487 | 12/1947 | Switzerland | 219/233 |
| 268795 | 9/1950 | Switzerland | 338/225 |

Primary Examiner—Anthony Bartis
Attorney, Agent, or Firm—Robic, Robic & Associates

[57] ABSTRACT

A soldering iron bit is heated by an electrical heating element including a resistive element consisting of granular boron carbide packed in a quartz tube embedded in a piece of copper. A first power lead is electrically connected to the boron carbide at one end of the quartz tube. This first power lead passes through and is electrically insulated from the piece of copper. The second power lead is electrically connected to the boron carbide at the other end of the quartz tube, either directly or via the piece of copper. In use, connection of the first and second leads to an electrical power source causes the resistive element to generate heat in a very fast manner and to transmit this heat to the piece of copper. The piece of copper may be connected to or constitute the soldering bit and can be provided with a built-in thermostat comprising a meltable salt inserted in a hole provided in the piece of copper. As soon as the salt reaches its melting point, it becomes conductive and allows an electrical current fed by a wire to circulate and to give a signal for switching off the electric power source of the element.

13 Claims, 4 Drawing Figures

THERMOSTATICALLY CONTROLLED ELECTRICALLY HEATED SOLDERING BIT present invention relates to an electrical heating element which comprises, as source of heat, a resistive element consisting of granular boron carbide packed in a quartz tube.

The use in a soldering iron or in a soldering bit of a resistive element consisting of at least one granular material packed in a tube or a hole provided in a piece of metal, is already known in the art. U.S. Pat. Nos. 467,765 and 594,872 disclose, by way of example, soldering irons each provided with a resistive element consisting of granular carbon. U.S. Pat. No. 796,684 discloses an electrical heating element including a resistive element consisting of ground silicon packed in a quartz tube. Canadian patent No. 376,879 discloses an electrical heating element comprising a metallic filament embedded into a granular material consisting of a mixture of zircon with ground silicon. Last of all, U.S. Pat. No. 2,861,163 discloses an electrical heating element wherein the resitive element consists of silicon carbide.

The object of the present invention is to provide an electrical heating element provided with a resistive element consisting of granular boron carbide packed in a quartz tube which is itself embedded into a piece of copper.

In accordance with the invention, it has been surprisingly found that the use of such a resistive element made of granular boron carbide packed in a quartz tube makes the electrical heating element very efficient in use and much faster to heat than most of the already known elements such as those disclosed in the above mentioned prior art references. In particular, it has been found that the use of such a resistive element makes the electrical heating element capable of heating a soldering bit up to 335° C. within less than 15 seconds using a standard 110 volt electrical supply.

The electrical heating element according to the invention basically comprises:

(a) a resistive element consisting of granular boron carbide packed in a quartz tube this quartz tube having one end closed by a plug of heat resistant, insulating material (b) a piece of copper embedding the resistive element;

(c) a first power lead electrically connected to the boron carbide at the closed end of the quartz tube, this first power lead passing through and being electrically insulated from the insulating plug and the piece of copper, respectively; and (d) a second power lead electrically connected to the other end of the resistive element.

In use, connection of the first and second leads to an electric power source causes the resistive element to generate heat and transmit this heat to the piece of copper in a very efficient and very fast manner.

In accordance with a first preferred embodiment of the invention, the piece of copper is in electrical contact with the boron carbide packed in the quartz tube at the other end of this tube, and the second power lead is fixed to the piece of copper and electrically connected to the other end of the resistive element via this piece of copper.

In accordance with another preferred embodiment of the invention, the other end of the quartz tube is closed by another plug of heat resistant, insulating material and the second power lead connected to the other end of the resistive element passes through, and is electrically insulated from, said other insulating plug and a piece of copper, respectively.

In both cases, the first and/or second power lead can be made of aluminum and be electrically insulated from the insulating plug(s) and piece of copper by a thick layer of aluminum oxide. Each of these power leads can be welded to a plug of aluminum located in the quartz tube adjacent to the insulating plug, in electrical contact with the boron carbide.

Advantageously, a pair of contact wires is provided to ensure permanent connection of the aluminum plug with the boron carbide and/or of the boron carbide with the piece of copper at both ends of the quartz tube, whenever be the relative, thermal expansion of these aluminum plug, quartz tube and piece of copper.

In accordance with another preferred embodiment of the invention, the electrical heating element may further comprise a thermostat for use to control the electric power source to which the electrical element is connected. This thermostat preferably comprises a meltable salt inserted in at least one hole provided in the piece of copper. As soon as the salt located in the hole approaches its melting temperature, it becomes conductive and allows an electrical current to circulate from a wire which can be the second power lead when this lead is fixed to the piece of copper, to an insulated thermostat wire inserted into the electrical heating element in such a manner as to be in electrical contact with the salt. This current can be used as a signal to switch off the electric power source. As soon as the temperature decreases and the salt solidifies again, the current stops circulating and switch on again the electric power source.

The structure of the electrical heating element according to the invention and its advantages will be better understood with reference to the following, non restrictive description of two preferred embodiments thereof, made in connection with the accompanying drawings in which.

Figure 1:
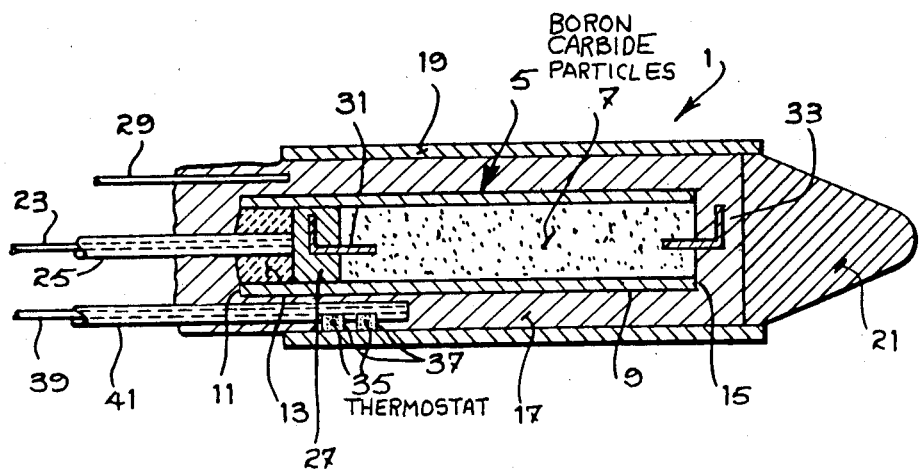
FIG. 1 is an elevational, cross-sectional view of an electrical heating element according to the invention.
Figure 2:
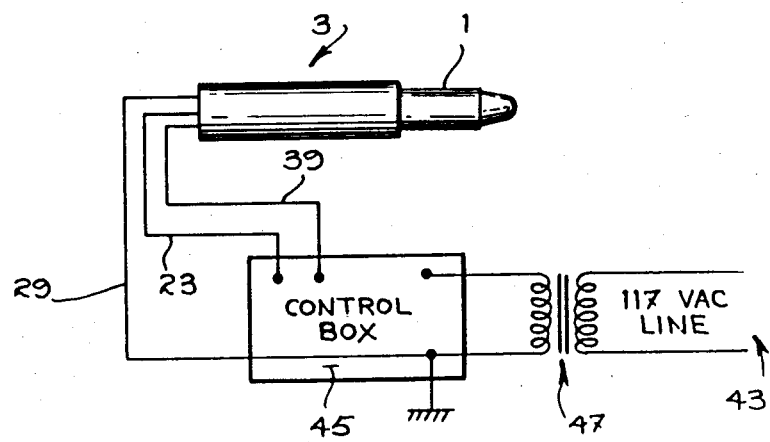
FIG. 2 is a diagrammatic view of a soldering unit incorporating the electrical heating element shown in FIG. 1.

The electrical heating element 1 shown in FIGS. 1 and 2 is intended to be used in a soldering iron or soldering bit 3 connected to an electrical power source 47 delivering a voltage equal to or lower than 24 volts.

The heating element 1 comprises a resistive element 5 consisting of granular boron carbide 7 packed in a small tube 9 made of quartz.

The quartz tube 9 has one end 11 closed by a plug 13 made of a heat resistant, insulating material. The other end 15 of the quartz tube 9 is left open.

The resistive element 5 is embedded into an elongated piece of copper 17. To achieve this embedding, the assembly is coated with a conductive coating and then immersed into a copper plating solution. After a thick layer of copper has been deposited, the assembly is removed and then machined to size.

The advantage of completely embedding the resistive element 5 into the piece of copper 17 is, on one hand, to protect the quartz tube from impacts and, on the other hand, to absorb the heat generated by the resistive element 5 and to "conduct" this heat where desired for soldering purposes.

Advantageously, an outer, protective jacket 19 preferably made of steel is mounted all around the piece of copper 17. As shown in FIG. 1, the jacket 19 projects forwards the front end of the piece of copper 17. This projection advantageously permits to mount an interchangeable soldering tip 21 made of copper or iron in closed contact with the piece of copper 17. The soldering tip 21 may, in use be press-fitted into the recieving hole formed by the jacket 19 and the end of the peice of copper 17 in such a manner as to project out as shown, by way of example, in FIG. 1.

A first power lead 23 preferably made of aluminum is electrically connected to the boron carbide 7 at the closed end 11 of the quartz tube 9. The first power lead 23 passes through the piece of copper 17 and the insulating plug 13 respectively, and is electrically insulated from both of them by a thick layer of aluminum oxide 25. To provide a better contact between the first power lead 23 and the boron carbide, a plug of aluminum 27 is located in the quartz tube adjacent the insulating plug 13. The aluminum plug 27 is welded at one end to the power lead 23 and has its opposite surface in direct contact with the boron carbide particles packed in the quartz tube 9.

A second power lead 29 preferably made of copper is provided and electrically connected to the piece of copper 17 embedding the resistive element 5.

In addition, a pair of contact wires 31 and 33 are provided to ensure permanent connection of the aluminum plug 27 with the boron carbide particles 7 and of these particles with the piece of copper 17 at both ends of the quartz tube respectively, whatever be the relative, thermal expansion of the aluminum plug, quartz tube, boron carbide particles and piece of copper. The contact wires 31 and 33 are preferably made of tungsten, although copper or any other material may also be used.

The electrical heating element 1 further comprises a thermostat for use to control its electric power supply when connected to an electric power source.

As shown in FIG. 1, this thermostat advantageously comprises a meltable salt 35 inserted in at least one hole 37 radially drilled into the external surface of the piece of copper 17. The salt 35 is in contact at one end of the hole 37 with the outer, protective jacket 19 which by the way acts as a cap for closing the hole 37. The salt 35 is in electrical contact at the other end of the hole 37 with a thermostat wire 39 passing through the body of the piece of copper 37 from which it is electrically insulated by a thick layer of aluminum oxide 41.

The salt 35 inserted into the hole 37 must, in order to make the thermostat useful and efficient, be not conductive in solid state and become conductive as soon as it is melted, such a melting occuring as soon as the temperature of the heating element 1 has become higher than the melting point of the selected salt.

As can now be easily understood, an electrical current will be allowed to circulate from the power lead 29 through the melted salt 35 to the thermostat wire 39, thereby providing an electrical signal, as soon as the temperature of the element 1 has exceeded the melting point of the salt 35.

As shown in FIG. 2, the thermostat wire 39 may be connected to a control box 45 mounted between the electric power source 47 and the power leads 23 and 29. The power source 47 may consist of a step-down isolation transformer 45 connected to a standard 117 VAC line 43. The control box 45 includes means (not shown) to switch off the electrical connection between the leads 23 and 29 and the power source 43 as soon as the salt 35 melts and thus allows and electrical signal to be supplied to the control box 45 via the thermostat wire 39. Of course, as soon as the temperature starts to decrease and becomes lower than the melting point of the salt 35, this salt starts again to solidify and becomes again non conductive. The electrical signal supplied from the control box to the thermostat wire 39 then stops and connects the electrical power source 47 to the power leads 23 and 29.

As can be easily understood, the melting point of the salt 35 is the operation temperature of the electrical heating element 1. Example of suitable salts 35 that can be used in accordance with the invention are:

potassium chlorate (MP. 356° C.)—control range 300°-330° C.

potassium dichromate (MP. 398° C.)—control range 330°-360° C.

lithium hydroxide (MP. 449° C.)—control range 380°-410° C.

strontium nitrate (MP. 570° C.)—control range 500°-530° C.

of course, use can also be made of mixtures of salts dipped or not. By way of examples, use can be made of a mixture of one part of potassium nitrate with two part of potassium dichromate, in which is dissolved as much chromium oxide (CrO and $Cr_2O_3$) as possible.

As aforesaid, the electrical heating elements disclosed hereinabove is intended to be connected to a power source 47 delivering a voltage equal to or lower than 24 volts. Such a voltage is in practice very low and substantially reduces the possibility of a shock hazard. In order to further reduce this possibility of shock hazard, the piece of copper 17 and, of course, its outer protective jacket 19 along with the tip 21 may be grounded, as shown in FIG. 2.

Figure 3:
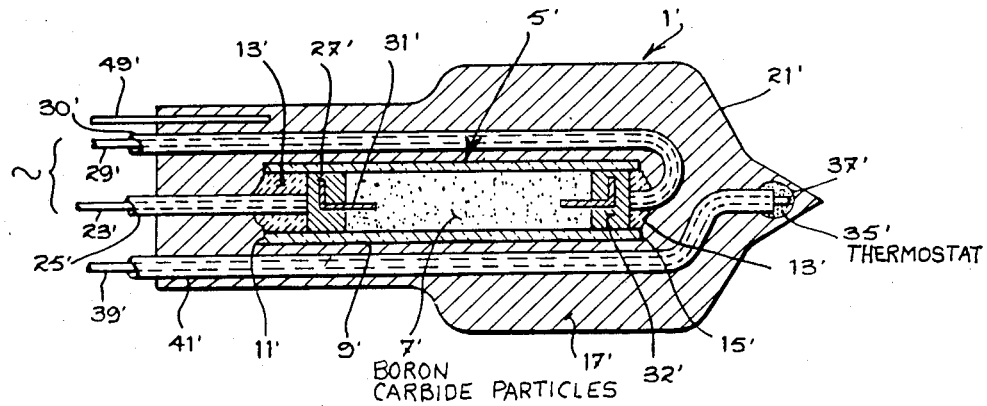
FIG. 3 is an elevational, cross-sectional view of another electrical heating element according to the invention.
Figure 4:
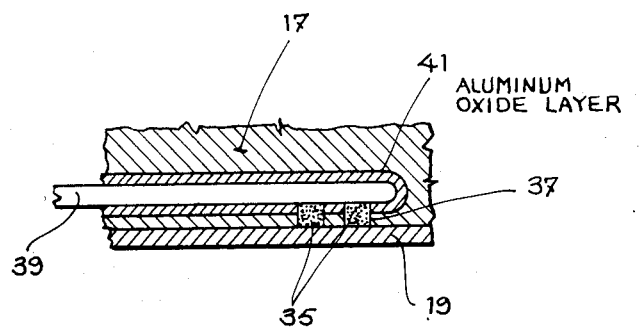
FIG. 4 is an enlarged, cross-sectional view showing the particular relationship of the thermostat components of the electrical heating element shown in FIG. 1.

The electrical heating element 1' shown in FIG. 3 is very similar to the one shown in FIG. 1, except that its electrical connections are designed to make it connectable to a power source delivering an output voltage higher than 24 volts. As most of the components of this electrical heating element 1' are similar or identical to the components previously disclosed with reference to FIGS. 1 and 2, the same reference numerals have been used with a prime (') as identification mark.

As can be seen, the heating element 1' comprises a resistive element 5' consisting of granular boron carbide 7' packed in a small tube 9' made of quartz. Contrary to the tube 9, the tube 9' has both of its ends 11 and 15 closed by plugs 13' made of a heat resistant, insulating material.

The resistive element 5' is embedded into an elongated piece of copper 17' whose purpose is to protect the quartz tube from impacts and to absorb the heat generated by the resistive element.

Contrary to the element 1 shown in FIGS. 1 and 2, the electrical heating element 1' shown in FIG. 3 does not comprise an interchangeable soldering tip but rather a built-in tip 21' integrally extending the front end of the piece of copper 17'.

A first power lead 23' made of aluminum is electrically connected to the boron carbide 7' at the closed end 11' of the tube 9'. The first power lead 23' passes through the piece of copper 17' and through the insulating plug 13' respectively, and is electrically insulated from both of them by a thick layer of aluminum oxide 25'. To provide a better contact between the first power lead 23' and the boron carbide, a plug of aluminum 27' is located in the quartz tube adjacent the insulating plug 13'. The aluminum plug 27' is welded at one end of the power lead 23' and has its opposite surface in direct contact with the boron carbide particles packed in the tube 9'.

A second power lead 29' also made of aluminum is electrically connected to the boron carbide 7 at the other, closed end 15' of the tube 9'. This second power lead 29' passes through the piece of copper 17' and through the insulating plug 13' at the other end 15' of the tube and is electrically insulated from both of them by a thick layer of aluminum oxide 30'. In order to provide a better contact between the second power lead 29' and the boron carbide, another plug of aluminum 32' can be located in the quartz tube adjacent the other plug 13' at the end 15' of the tube. The plug 32' can be welded at one end of the power lead 29' with its opposite surface in direct contact with the boron carbide particle packed in the quartz tube 9'.

A pair of contact wires 31' and 33' may be provided at both ends of the quartz tube, respectively, to ensure permanent connection of the aluminum plugs 27' and 32' with the boron carbide particles 7' whatever be the relative, thermal expansion of the plugs, tubes, boron carbide particles and copper. The wires 31' and 33' can be made of tungsten or any other material.

As the element 1, the electrical heating element 1' may comprise a thermostat to control its electrical power supply when connected to an electrical power source. This thermostat may comprise a meltable salt 35' inserted in one hole 37' provided in the piece of copper 17'. The salt 35' is an electrical contact with a thermostat wire 39' passing through the body of the piece of copper 17' from which it is electrically insulated by a thick layer of aluminum oxide 41'. Another wire 49' preferably made of copper is provided and electrically connected to the piece of copper 17' embedding the resistive element 5 to provide a return of the current supplied by the wire 39'. As a result, an electrical current will be allowed to circulate from the wire 39' through the salt 35' to the wire 49' as soon as the temperature of the element has exceeded the melting point of the salt 35. The wires 39' and 49' may be connected to a control box (not shown) as explained hereinabove in order to control and switch off and/or on the electrical connection between the power leads 23' and 29' and the power source (not shown) as soon as the salt 35 melts.

Advantageously, the hole 37' in which the salt 35' is inserted is provided in the working tip end 21' of the element 1' since, when the element 1' is used in soldering bit or iron, the temperature of the tip is the critical temperature to control.

To reduce as much as possible the shock hazard and make the element very safe in use, the piece of copper 17 may be grounded by means of its wire 49'.

The electrical heating element 1 and 1' described hereinabove are very efficient in use and much faster than any other electrical heating element known to the applicant. It is very safe and convenient in use, especially due to its thremostatic control which is very simple in operation and does not make use of any mechanical part.

Although the elements 1 and 1' have exclusively been described for use in a soldering bit or iron, they can also be used for other purposes, such as, for example, as heating element in a water heating tank.

What is claimed is:
1. An electrical heating element comprising:
(a) a resistive element consisting of granular boron carbide packed in a quartz tube, said tube having one end closed by a plug of heat resistant insulating material, and another open end;
(b) a piece of copper embedding the resistive element, said piece of copper being in electrical contact with the boron carbide packed in the quartz tube at said other open end of said tube;
(c) a first power lead electrically connected to the boron carbide at the closed end of the quartz tube, said first power lead passing through, and being electrically insulated from, the insulating plug and the piece of copper, respectively; and
(d) a second power lead electrically connected to the other end of the resistive element, said second power lead being fixed to the piece of copper and electrically connected to the other end of the resistive element via said piece of copper;
whereby connection of the first and second leads to an electric power source causes the resistive element to generate heat and transmit said heat to the piece of copper in a very efficient and fast manner; and
wherein:
said first power lead is made of aluminum and is electrically insulated from the insulating plug and the piece of copper by a thick layer of aluminum oxide;
said first power lead is welded to a plug of aluminum located in the quartz tube adjacent to the insulating plug, said aluminum plug being in electrical contat with the boron carbide; and
said second powerlead is made of copper.

2. The electrical heating element of claim 1, further comprising:
(e) a pair of contact wires electrically connected to the aluminum plug and copper piece, respectively and both extending into the granular boron carbide in order to ensure permanent connection of the aluminum plug with the boron carbide and of the boron carbide with the piece of copper at the ends of the quartx tube, whatever be the relative, thermal expansion of said aluminum plug, quartz tube and piece of copper.

3. The electrical heating element of claim 2, wherein said contact wires are made of tungsten.

4. The electrical heating element of claim 3, further comprising:
(h) a thermostate for controlling the electric power source, said thermostat comprising:
a meltable salt inserted in at least one hole provided in the piece of copper, said salt being in direct contact with said piece of copper and melting at a predetermined temperature and becoming conductive in melted state;
a thermostat wire in electrical contact with said salt, said thermostat wire being insulated from the piece of copper; and
means in circuit with said piece of copper and said thermostat wire for swithcing off the electric power source as soon as the salt melts and allows the electric current passing through the piece of copper to flow through the melted salt to the thermostat wire.

5. The electrical heating element of claim 4, wherein the meltable salt is selected from the group consisting of potassium dichromate (MP. 398° C.), potassium chlorate (MP. 356° C.), lithium hydroxide (MP. 449° C.) and strontium nitrate (MP. 570° C.).

6. The electrical heating element of claim 5, wherein the thermostat wire is made of aluminum and is insulated from the piece of copper by a thick layer of aluminum oxide.

7. The electrical heating element of claim 2, further comprising:
(f) an outer, protective jacket, said jacket extending around the piece of copper; and
(g) a soldering tip mounted at one end of the piece of copper, said soldering tip projecting out of said jacket.

8. The electrical heating element of claim 7, wherein:
said outer jacket is made of steel; and
said soldering tip is made of a metal selected from the group consisting of copper and iron.

9. An electrical heating element comprising:
(a) a resistive element consisting of granular boron carbide packed in a quartz tube closed at one end by a plug of heat resistant insulating material and at the other end by another plug of heat resistant insulating material;
(b) a piece of copper embedding the resistive element;
(c) a first power lead electrically connected to the boron carbide at one closed end of the quartz tube, said first power lead passing through, and being electrically insulated from the corresponding insulating plug and the piece of copper, respectively; and
(d) a second power lead electrically connected to said other closed end of the quartz tube, said second power lead passing through, and being insulated from, said other corresponding plug and the piece of copper respectively,
whereby connection of the first asnd second leads to an electric power source causes the resistive element to generate heat and transmit said heat to the piece of copper in a very efficient and fast manner; and
wherein:

said first and second power leads are made of aluminum and are electrically insulated from their respective insulating plugs and piece of copper by a thick layer of aluminum oxide;
each of said power leads is welded to a plug of aliminum located in the quartz tube adjacent to the corresponding insulating plug, said aluminum plug being in electrical contact with the boron carbide; and
a pair of contact wires electrically connected to the aluminum plugs, respectively, and both extending into the granular boron carbide are provided to ensure permanent connection of each of the aluminum plugs with the boron carbide at the ends of the quartz tube.

10. The electrical heating element of claim 9, wherein said contact wires made of tungsten.

11. The electrical heating element of claim 10, further comprising:
(h) a thermostat for controlling the electric power source, said thermostat comprising:
a meltable salt inserted in at least one hole provided in the piece of copper, said salt being in direct contact with said piece of copper and melting at a predetermined temperature and becoming conductive in melted state;
an insulated, thermostat wire in electrical contact eith said salt;
another thermostat wire in electrical contact with the piece of copper; and
means to circuit with said thermostat wires for switching off the electrical power source as soon as the salt melts and allows a current to flow between the thermostat wires through the melted salt and piece of copper.

12. The electrical heating element of claim 11, wherein:
the piece of copper defines a soldering tip having a soldering tip end; and
the hole in which is inserted the meltable salt of the thermostat, is located in said soldering tip end.

13. The electrical heating element of claim 12, wherein:
the meltable salt is made of a mixture of one part of potassium nitrate with two parts of potassium dichromate in which is dissolved as much chromium oxide as possible.

* * * * *